(12) United States Patent
Wang et al.

(10) Patent No.: US 8,434,096 B2
(45) Date of Patent: Apr. 30, 2013

(54) METHOD, SYSTEM AND DEVICE FOR MANAGING CUSTOMER PREMISES EQUIPMENT

(75) Inventors: Jing Wang, Shenzhen (CN); Guiming Shu, Shenzhen (CN); Huangwei Wu, Shenzhen (CN); Yuanyuan Fan, Shenzhen (CN)

(73) Assignee: Huawei Device Co., Ltd, Shenzhen (CN)

( * ) Notice: Subject to any disclaimer, the term of this patent is extended or adjusted under 35 U.S.C. 154(b) by 497 days.

(21) Appl. No.: 12/790,503

(22) Filed: May 28, 2010

(65) Prior Publication Data

US 2010/0242052 A1 Sep. 23, 2010

Related U.S. Application Data

(63) Continuation of application No. PCT/CN2009/071668, filed on May 7, 2009.

(30) Foreign Application Priority Data

Jun. 11, 2008 (CN) .......................... 2008 1 0100448

(51) Int. Cl.
*G06F 13/00* (2006.01)
(52) U.S. Cl.
USPC .......................................... 719/313; 719/316
(58) Field of Classification Search .................. 719/313, 719/316
See application file for complete search history.

(56) References Cited

U.S. PATENT DOCUMENTS

| | | | |
|---|---|---|---|
| 8,111,631 B2 * | 2/2012 | Acke et al. | 370/254 |
| 2007/0025341 A1 * | 2/2007 | Baigal et al. | 370/352 |
| 2007/0083489 A1 | 4/2007 | Lawande | |
| 2008/0212495 A1 * | 9/2008 | Stirbu | 370/254 |
| 2009/0252062 A1 * | 10/2009 | Justen et al. | 370/255 |

FOREIGN PATENT DOCUMENTS

| | | |
|---|---|---|
| CN | 101127630 A | 2/2008 |
| EP | 2 068 496 A1 | 6/2009 |
| WO | WO 2007/014369 A2 | 2/2007 |
| WO | WO 2008/022590 A1 | 2/2008 |

OTHER PUBLICATIONS

"CPE WAN Management Protocol," Technical Report, DSL Forum, TR-069 Amendment 1, Nov. 2006. pp. 1-128, DSLHome-Technical Working Group.
"TR-069; CPE WAN Management Protocol v1.1," Technical Report, Amendment 2, Dec. 2007, 46 pages, Issue 1, The Broadband Forum.
European Search Report, Application No. 09007711.6-2416, Dated Aug. 19, 2009, 8 pages.
Chinese Office Action, Application No. 200810100448.5, Dated May 11, 2010,10 pages.
International Search Report, International application No. PCT/CN2009/071668, Date of mailing of the international search report Aug. 6, 2009, 4 pages.
European Office Action, European Application No. 09 007 711.6-2416, Dated: Sep. 10, 2010, 5 pages.

\* cited by examiner

*Primary Examiner* — Andy Ho
(74) *Attorney, Agent, or Firm* — Slater & Matsil, L.L.P.

(57) ABSTRACT

In a method for managing a Customer Premises Equipment (CPE), an Auto-Configuration Server (ACS) designates a first designated instance number for a first instance object. A message is then sent to the CPE. The message carries the first designated instance number for the first instance object and is adapted to notify the CPE to take the first designated instance number as an instance number for the first instance object.

9 Claims, 5 Drawing Sheets

METHOD, SYSTEM AND DEVICE FOR MANAGING CUSTOMER PREMISES EQUIPMENT

This application is a continuation of co-pending International Application No. PCT/CN2009/071668, filed May 7, 2009, which designated the United States and was not published in English, and which claims priority to Chinese Application No. 200810100448.5 filed Jun. 11, 2008, both of which applications are incorporated herein by reference.

TECHNICAL FIELD

The present invention relates to the field of network communication technologies, and in particular to a method, a system and a device for managing customer premises equipment (CPE).

BACKGROUND

TR-069 is a CPE management protocol issued by DSL Forum, which provides a general framework and protocol for managing and configuring home network devices in the next-generation network, then remote and centralized management of the devices, such as gateways, routers and set-top boxes in the home network is performed at network side. In the framework defined by TR-069, two types of logical devices, Auto-Configuration Server (ACS) and CPE, are included. An interactive flow, communication protocol and basic information, etc., between CPE and ACS are also defined in the framework for the purpose of the same protocol based interaction among different vendors.

In the TR-069 protocol, a Remote Procedure Call (RPC) mechanism is used for mutual communication between CPE and ACS. ACS may invoke a RPC method supported by CPE to create, modify and delete an instance object on CPE. In the RPC mechanism, the procedure of creating the instance object includes the following: ACS sends to CPE an instance creation message AddObject which includes a pathname parameter ObjectName carrying pathname information of the created instance object and an additional parameter Parameterkey; and upon receiving the AddObject message, CPE creates the object instance and allocates an instance number to the created object instance randomly, then returns an AddObject response message carrying the parameter InstanceNumber to ACS. In conventional techniques, once allocated by CPE, the instance number cannot be changed until ACS deletes the instance object by an object deletion message DeleteObject. Table 1 and Table 2 respectively show the parameters in the AddObject message and the AddObject response message.

TABLE 1

| Parameters | Types | Descriptions |
|---|---|---|
| ObjectName | string (256) | The pathname of the collection of objects for which an instance to be created. The path name should end with a "." (dot) after the last node in the hierarchical name of the object. |
| ParameterKey | string (32) | The value of the parameter is determined by the server. The value can also be null. |

TABLE 2

| Parameters | Types | Descriptions |
|---|---|---|
| InstanceNumber | UnsignedInt [1:] | The instance number of the created object instance. |
| Status | int [0: 1] | A successful response of the method returns an integral enumerated type: 0 = the instance object has been created 1 = the created instance object has already been validated and submitted, but not applied yet. |

In the conventional techniques, when obtaining the instance number allocated randomly by CPE from the AddObject response message returned by CPE, ACS can invoke the parameters and sub-objects in the instance object by using the instance number in the pathname carried in the ObjectName. However, an ACS generally manages a large number of CPEs. When ACS creates the same instance object for each CPE managed by the ACS itself, the instance numbers of the same instance object corresponding to the respective CPEs are different since each CPE itself may generate randomly an instance number for the same instance object. In this way, when managing the same instance object for different CPEs, ACS needs to query the instance number of the same instance object corresponding to each CPE, which leads to a workload for the management of CPE by ACS.

SUMMARY OF THE INVENTION

Embodiments of the present invention provide a method, a system and a device for managing a CPE, so as to lighten the workload for the management of CPE by ACS.

A method for managing a CPE includes the following: An ACS designates a first designated instance number for a first instance object, and sends to the CPE a message carrying the first designated instance number for the first instance object. The message is used to notify the CPE to take the first designated instance number as an instance number for the first instance object.

A system for managing a CPE includes an Auto-Configuration Server (ACS) configured to designate a first designated instance number for a first instance object, and send to the CPE a message carrying the first designated instance number for the first instance object. The system also includes a Customer Premises Equipment (CPE) configured to receive the message sent from the ACS, and take the first designated instance number as an instance number for the first instance object.

An Auto-Configuration Server (ACS) includes a message generating unit configured to designate a first designated instance number for a first instance object, and generate a message carrying the first designated instance number for the first instance object. The ACS also includes a message sending unit configured to send the message generated by the message generating unit.

A Customer Premises Equipment (CPE) includes a message receiving unit configured to receive a message carrying a first designated instance number for a first instance object sent by an Auto-Configuration Server (ACS). The CPE also includes a first instance number configuring unit, configured to take the first designated instance number as an instance number for the first instance object.

It can be seen from the above technical solutions that, in the method, system and device provided by the embodiments of the present invention, the ACS designates the first designated instance number for the first instance object, and sends to the CPE the message carrying the first designated instance number for the first instance object to notify the CPE to take the first designated instance number as the instance number for the first instance object. With this method, when the ACS creates the same instance object for a plurality of CPEs, the same instance number can be designated to the same instance object for the respective CPEs. In this way, the same instance object can be invoked by using the same instance number without querying and judging each of the CPEs, thus lightening the workload of the management of CPE by ACS.

DETAILED DESCRIPTION OF ILLUSTRATIVE EMBODIMENTS

In order to make the objects, technical solutions and advantageous more apparently, hereinafter, the present invention will be illustrated in detail with reference to the drawings and embodiments.

An embodiment of the present invention provides a method including the following: an ACS designates a first designated instance number for a first instance object, and sends to the CPE a message carrying the first designated instance number for the first instance object to notify the CPE to take the first designated instance number as an instance number for the first instance object.

When creating the same instance object for different CPEs, the ACS may designate the same instance number for the same instance object, and notify the designated same instance number to the CPE, and the CPE takes the designated same instance number as an instance number for the same instance object.

Hereinafter, the method will be described in detail with some embodiments.

Embodiment 1

Figure 1:
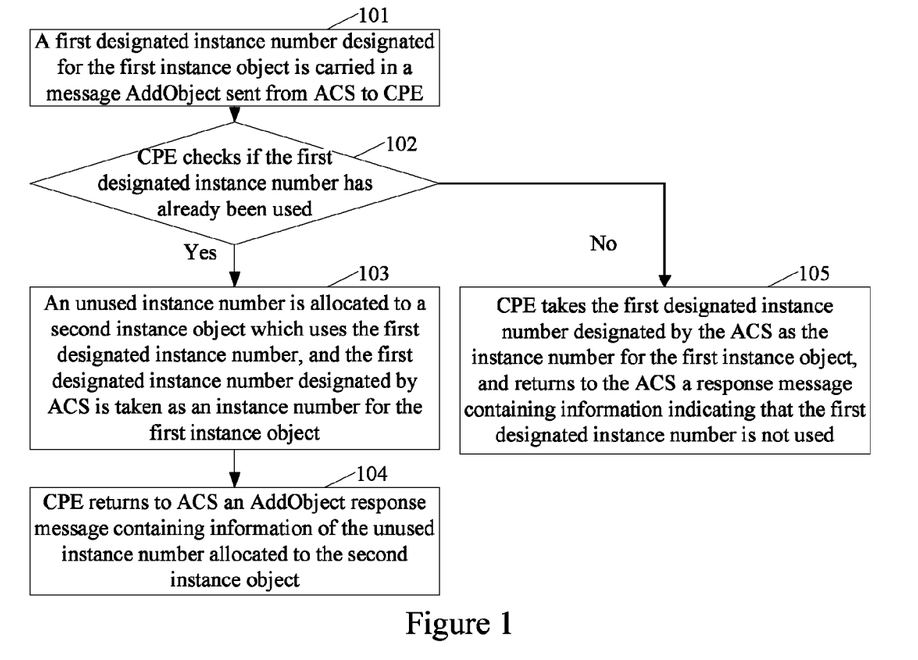
FIG. 1 is a flow chart of a method according to a first embodiment of the present invention.

FIG. 1 is a flow chart of a method according to a first embodiment of the present invention. In this embodiment, the ACS may designate an instance number for the created same instance object in the process of creating the object instance, so as to perform a unified management for the instance object. Assuming the created instance object is a first instance object, as shown in FIG. 1, the method may include the following steps:

Step 101: A first designated instance number designated for the first instance object is carried in a message AddObject sent from the ACS to the CPE.

In this step, the ACS may provide in the AddObject message a parameter InstanceNumber where an instance number designated for the instance object created by the message AddObject is carried. Table 3 shows the parameters in the message AddObject according to the first embodiment of the present invention.

TABLE 3

| Parameters | Types | Descriptions |
| --- | --- | --- |
| ObjectName | string (256) | The pathname of the collection of objects for which a new instance to be created. The path name should end with a "." (dot) after the last node in the hierarchical name of the object. |
| ParameterKey | string (32) | The value of the parameter is determined by the server. The value can also be null. |
| InstanceNumber | UnsignedInt [1:] | The instance number designated for the created instance object. Once created, the instance number can be used in the pathname to refer to the parameters and sub-objects in the instance object. The instance number is designated by the ACS. |

Step 102: When receiving the message AddObject, the CPE retrieves the designated first designated instance number, and checks if the first designated instance number has already been used; if it has been used, the process proceeds to Step 103; otherwise, the process proceeds to Step 105.

Step 103: The CPE allocates an unused instance number to a second instance object which uses the first designated instance number, and takes the first designated instance number designated by the ACS as an instance number for the first instance object.

Step 104: The CPE returns to the ACS an AddObject response message containing information of the unused instance number allocated to the second instance object.

For example, if the first designated instance number designated for the first instance object by the ACS is 5, and the CPE checks that the instance number 5 has already been used by an other instance object, the CPE will allocate an unused instance number to other instance object which uses the instance number 5; for example, if the instance number 8 has not been used yet, the CPE may allocate the instance number 8 to the instance object which uses the instance number 5, and takes the instance number 5 as the instance number for the first instance object.

Step 105: The CPE takes the first designated instance number designated by the ACS as the instance number for the first instance object, and returns to the ACS a response message containing information indicating that the first designated instance number is not used.

In this step, an instance number modification parameter ChangeNumber can be provided in the AddObject response message to carry information of an unused instance number allocated for the second instance object. Table 4 shows components of the parameters in the AddObject response message in the first embodiment of the present invention. As for the returned AddObject response message, if the first designated instance number designated by the ACS is not used, an AddObject response message containing information indicating that the first designated instance number is not used can be returned. For example, an AddObject response message in which the value of parameter ChangeNumber is zero can be returned.

TABLE 4

| Parameters | Types | Descriptions |
|---|---|---|
| ChangeNumber | UnsignedInt [1:] | An instance number re-allocated to the instance object which uses the first designated instance number. The instance number is allocated by the CPE. If the first designated instance number is not used, the returned value is 0. |
| Status | Int [0: 1] | A successful response of the method returns an integral enumerated type: 0 = the instance object has been created. 1 = the created instance object has already been validated and submitted, but not applied yet. |

Additionally, in the step, if execution of the step that the CPE takes the first designated instance number as the instance number for the first instance object fails, an AddObject response message containing information indicating execution failure can be returned to the ACS.

Embodiment 2

Figure 2:
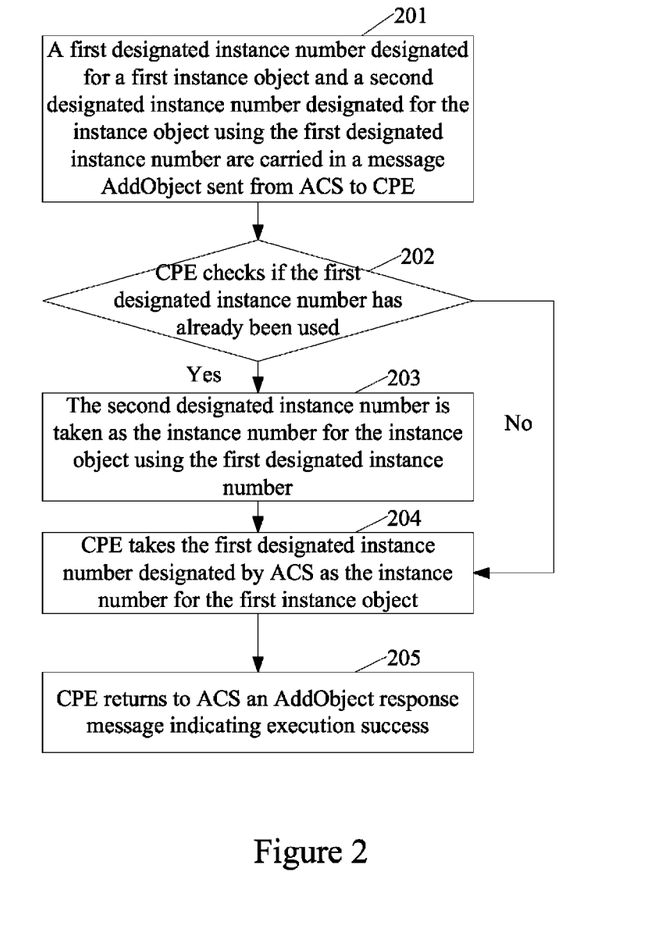
FIG. 2 is a flow chart of a method according to a second embodiment of the present invention.

FIG. 2 is a flow chart of a method according to a second embodiment of the present invention. In this embodiment, the ACS also designates an instance number for the created same instance object in the process of creating the object instance, so as to perform a unified management for the instance object. In addition, the ACS also designates another instance number for the instance object which uses the designated instance number. As shown in FIG. 2, the method may include the following steps:

Step 201: A first designated instance number designated for a first instance object and a second designated instance number designated for the instance object using the first designated instance number are carried in a message AddObject sent from the ACS to the CPE.

In this step, besides that the ACS may provide in the AddObject message a parameter InstanceNumber where an instance number designated for the instance object created by the message AddObject is carried, a parameter ChangeNumber carrying a second designated instance number designated for the instance object using the first designated instance number may also be provided in the AddObject message. Table 5 shows the parameters in the AddObject message according to the second embodiment of the present invention.

Step 202: When receiving the message AddObject, the CPE retrieves the designated first designated instance number, and checks if the first designated instance number has already been used; if it has been used, the process proceeds to Step 203; otherwise, the process proceeds to Step 204.

Step 203: The second designated instance number is taken as the instance number for the instance object using the first designated instance number.

Step 204: The CPE takes the first designated instance number designated by the ACS as the instance number for the first instance object.

For example, if the ACS designates the first designated instance number 5 for the first instance object, and designates another instance number, i.e., the second designated instance number 8 for the instance object using the first designated instance number, and the CPE checks that the instance number 5 has already been used by other instance object, the CPE will modify the instance number for other instance object using the instance number 5 to be the instance number 8, and take the instance number 5 as the instance number for the first instance object.

Step 205: The CPE returns to the ACS an AddObject response message indicating execution success.

In this step, after the CPE succeeds in executing creation of the instance object, and taking the first designated instance number designated by the ACS as the instance number of the instance object, the CPE returns to the ACS an AddObject response message. Table 6 shows the parameters in the AddObject response message according to the second embodiment of the present invention.

TABLE 5

| Parameters | Types | Descriptions |
|---|---|---|
| ObjectName | string (256) | The pathname of an object set of a new created instance, which is to be ended with a symbol "." following the last node of an object level name. |
| ParameterKey | string (32) | The value of the parameter is determined by the server. The value can also be null. |
| InstanceNumber | UnsignedInt [1:] | The instance number designated for the created instance object. Once created, the instance number can be used in the pathname to refer to the parameters and sub-objects in the instance object. The instance number is designated by the ACS. |
| ChangeNumber | UnsignedInt [1:] | An instance number re-allocated to the instance object which uses the first designated instance number. The instance number is allocated by the ACS. |

TABLE 6

| Parameters | Types | Descriptions |
| --- | --- | --- |
| Status | Int [0:1] | A successful response of the method returns an integral enumerated type: 0 = the instance object has been created 1 = the created instance object has already been validated and submitted, but not applied yet. |

Embodiment 3

Figure 3:
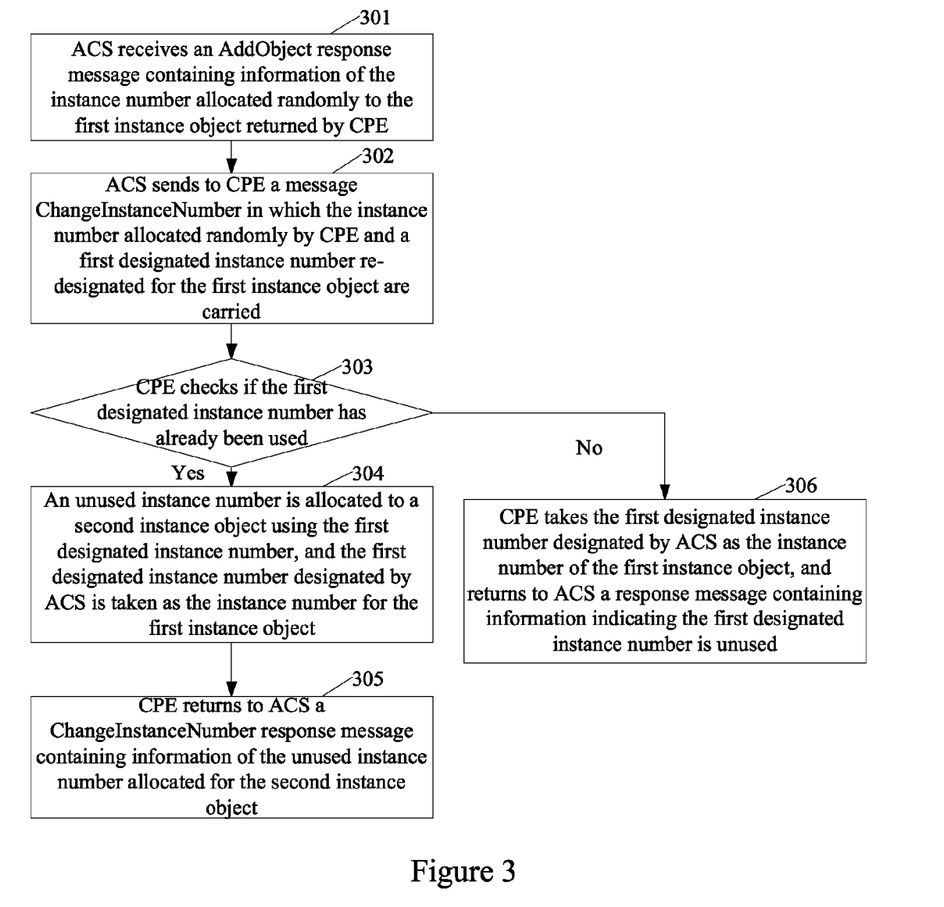
FIG. 3 is a flow chart of a method according to a third embodiment of the present invention.

FIG. 3 is a flow chart of a method according to a third embodiment of the present invention. In this embodiment, after receiving an AddObject response message returned by the CPE which contains a randomly allocated instance number, the ACS may designate the instance number of the same instance object to be the same designated instance number and send an instance number modification message ChangeInstanceNumber containing the designated instance number to the CPE. Assume that the instance object to be modified is a first instance object, as shown in FIG. 3, the method may include the following steps:

Step 301: The ACS receives an AddObject response message containing information of the instance number allocated randomly to the first instance object returned by the CPE.

Step 302: The ACS sends to the CPE a message ChangeInstanceNumber in which the instance number allocated randomly by the CPE and a first designated instance number re-designated for the first instance object are carried.

In this step, the message ChangeInstanceNumber may be a message configured additionally for modifying the instance number. In this message, a primary instance number parameter PrimalNumber carrying the instance number allocated by the CPE primarily and randomly for the first instance object may be provided. A parameter InstanceNumber carrying the instance number, i.e., the first designated instance number, re-designated for the first instance object by the ACS may also be provided in the message. Table 7 shows the parameters in the ChangeInstanceNumber message according to the third embodiment of the present invention.

TABLE 7

| Parameters | Types | Descriptions |
| --- | --- | --- |
| PrimalNumber | UnsignedInt [1:] | an instance number allocated randomly by CPE when the instance object is created |
| InstanceNumber | UnsignedInt [1:] | an instance number designated by ACS |

Step 303: When receiving the message ChangeInstanceNumber, the CPE retrieves the designated first designated instance number, and checks if the first designated instance number has already been used; if it has been used, the process proceeds to Step 304; otherwise, the process proceeds to Step 306.

Step 304: The CPE allocates an unused instance number for a second instance object using the first designated instance number, and takes the first designated instance number designated by the ACS as the instance number for the first instance object.

In this step, the CPE replaces the instance number allocated randomly to the first instance object with the first designated instance number depending on the contents carried in the message ChangeInstanceNumber sent by the ACS.

Step 305: The CPE returns to the ACS a ChangeInstanceNumber response message containing information of the unused instance number allocated for the second instance object.

Step 306: The CPE takes the first designated instance number designated by the ACS as the instance number of the first instance object, and returns to the ACS a response message containing information indicating the first designated instance number is unused.

In this step, a parameter ChangeNumber may be provided for carrying information of the unused instance number allocated to the second instance object in the ChangeInstanceNumber response message. A parameter Status may further be provided in the ChangeInstanceNumber response message for carrying information indicating whether the modification of the instance number for the first instance object succeeds. Table 8 shows components of the parameters in the ChangeInstanceNumber response message in the third embodiment of the present invention. As to the returned ChangeInstanceNumber response message, if the first designated instance number designated by the ACS is unused, a ChangeInstanceNumber response message containing information indicating that the first designated instance number is unused may be returned. For example, a ChangeInstanceNumber response message in which the value of the ChangeNumber parameter is zero may be returned.

TABLE 8

| Parameters | Types | Descriptions |
| --- | --- | --- |
| ChangeNumber | UnsignedInt [1:] | An instance number re-allocated to the instance object which uses the first designated instance number. The instance number is allocated by the CPE. If the first designated instance number is not used, a value of zero is returned. |
| Status | Int [0:1] | A successful response of the method returns an integral enumerated type: 0 = modification of the instance number fails 1 = modification of the instance number succeeds |

Embodiment 4

Figure 4:
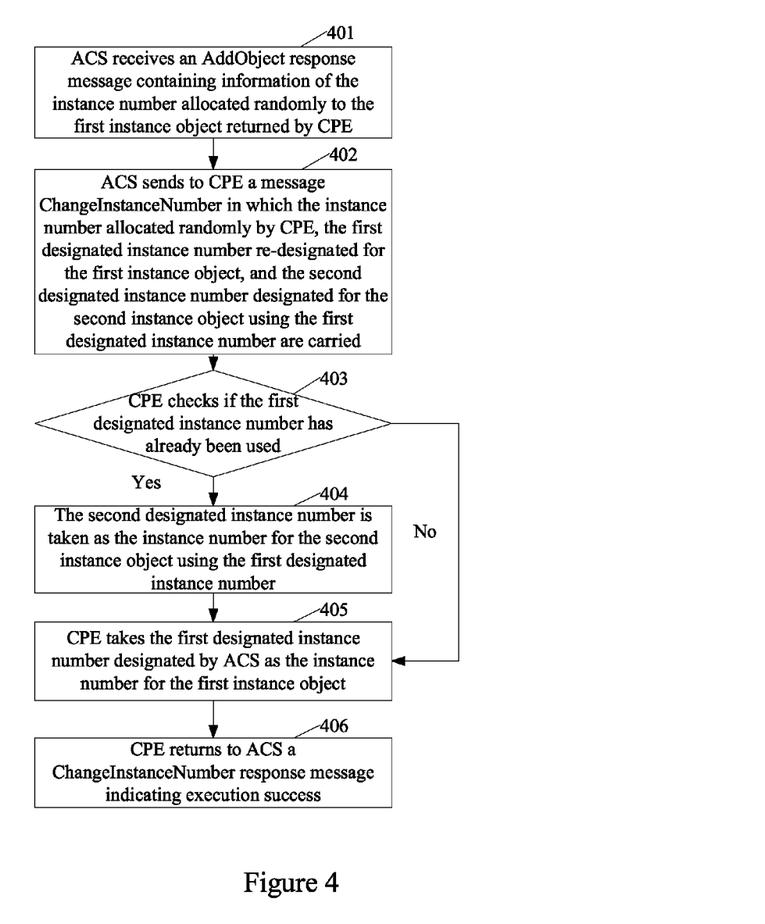
FIG. 4 is a flow chart of a method according to a fourth embodiment of the present invention.

FIG. 4 is a flow chart of a method according to a fourth embodiment of the present invention. In this embodiment, after receiving an AddObject response message returned by the CPE which contains a randomly allocated instance number, the ACS may designate the instance number of the same instance object to be the same designated instance number, for example a first designated instance number. Further, the ACS may designate another instance number, for example, a second designated instance number for the instance object using the first designated instance number, and send to the CPE a ChangeInstanceNumber message containing the first designated instance number and the second designated instance number. Assuming that the instance object to be modified is a first instance object, and the instance object using the first designated instance number is a second instance object. As shown in FIG. 4, the method may include the following steps:

Step 401: The ACS receives an AddObject response message containing information of the instance number allocated randomly to the first instance object returned by the CPE.

Step 402: The ACS sends to the CPE a message ChangeInstanceNumber in which the instance number allocated randomly for the first instance object by the CPE, the first designated instance number designated for the first instance object by the ACS, and the second designated instance number designated for the second instance object using the first designated instance number are carried.

In this step, the message ChangeInstanceNumber may be a message further configured to modify the instance number. In this message, the following parameters may be provided: a parameter PrimalNumber configured to carry the instance number allocated primarily and randomly for the first instance object by the CPE, a parameter InstanceNumber configured to carry the instance number re-designated for the first instance object, i.e., the first designated instance number, by the ACS, and a parameter ChangeNumber configured to carry the second designated instance number designated for the second instance object. Table 9 shows components of the parameters in the message ChangeInstanceNumber in the third embodiment of the present invention.

TABLE 9

| Parameters | Types | Descriptions |
| --- | --- | --- |
| PrimalNumber | UnsignedInt [1:] | an instance number allocated randomly by CPE when the instance object is created |
| InstanceNumber | UnsignedInt [1:] | an instance number designated by ACS |
| ChangeNumber | UnsignedInt [1:] | An instance number re-designated to the instance object which uses the first designated instance number. The instance number is designated by the ACS. |

Step 403: When receiving the message ChangeInstanceNumber, the CPE retrieves the designated first designated instance number, and checks if the first designated instance number has already been used; if it is used, the process proceeds to Step 404; otherwise, the process proceeds to Step 405.

Step 404: The second designated instance number is taken as the instance number for the second instance object using the first designated instance number.

Step 405: The CPE takes the first designated instance number designated by the ACS as the instance number for the first instance object.

Step 406: The CPE returns to the ACS a ChangeInstanceNumber response message indicating execution success.

In this step, after modifying the instance number for the first instance object, the CPE returns to the ACS a ChangeInstanceNumber response message. Table 10 shows the parameters in the ChangeInstanceNumber response message according to the fourth embodiment of the present invention.

TABLE 10

| Parameters | Types | Descriptions |
| --- | --- | --- |
| Status | Int [0: 1] | A successful response of the method returns an integral enumerated type: 0 = modification of the instance number fails 1 = modification of the instance number succeeds |

The software corresponding to the embodiment of the present invention may be stored in a computer readable storage medium.

Figure 5:
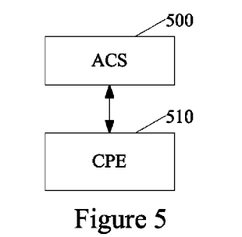
FIG. 5 is a structural diagram of a system according to an embodiment of the present invention.

FIG. 5 is a structural diagram of a system according to an embodiment of the present invention. As shown in FIG. 5, the system includes: ACS 500 and CPE 510.

ACS 500 is configured to designate a first designated instance number for a first instance object, and send to a CPE a message carrying the first designated instance number for the first instance object.

CPE 510 is configured to receive the message sent by the ACS 500, and take the first designated instance number as an instance number for the first instance object.

When creating the same instance object for different CPEs, the ACS 500 may designate the same instance number, i.e., the first designated instance number, for the same instance object, and notify the first designated instance number to the CPE. The CPE takes the designated instance number as the instance number for the instance object.

The first designated instance number may be carried in the AddObject message or in the further ChangeInstanceNumber message by the ACS. Alternatively, the first designated instance number may be carried in other messages to send to the CPE.

CPE 510 may further be used to check if the first designated instance number has already been used, allocate an unused instance number to a second instance object using the first designated instance number if the first designated instance number has been used, and return to the ACS a response message containing information of the instance number allocated to the second instance object.

ACS 500 may further be used to carry a second designated instance number designated by the ACS itself for the second instance object using the first designated instance number in the message to notify the CPE to replace the instance number of the second instance object with the second designated instance number.

Figure 6:
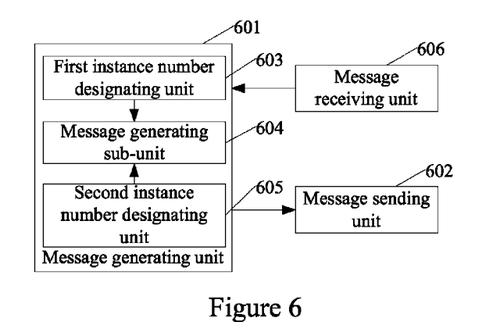
FIG. 6 is a structural diagram of an ACS according to an embodiment of the present invention.

FIG. 6 is the structural diagram of the ACS according to an embodiment of the present invention. As shown in FIG. 6, the ACS may include: a message generating unit 601 and a message sending unit 602.

The message generating unit 601 is configured to designate a first designated instance number for a first instance object, and generate a message carrying the first designated instance number for the first instance object.

The message sending unit 602 is configured to send the message generated by the message generating unit 601.

The message generating unit 601 may include: a first instance number designating unit 603 and a message generating sub-unit 604.

The first instance number designating unit 603 is configured to designate the first designated instance number for the first instance object.

The message generating sub-unit 604 is configured to generate a message AddObject or a message ChangeInstanceNumber, in either of which the first designated instance number is carried.

The message sending unit 602 is particularly configured to send the message AddObject or the message ChangeInstanceNumber.

The message generating unit 601 may further include a second instance number designating unit 605 configured to designate a second designated instance number for a second instance object using the first designated instance number.

The message generating sub-unit 604 is further configured to carry the second designated instance number in the generated message AddObject or the message ChangeInstanceNumber.

The ACS further includes a message receiving unit 606 configured to receive an AddObject response message sent by the CPE which contains the instance number allocated randomly to the first instance object.

The message generating sub-unit 604 is further configured to retrieve the instance number in the AddObject response message which is allocated to the first instance object by the CPE, and carry the instance number allocated randomly to the first instance object by the CPE in the generated message ChangeInstanceNumber to notify the CPE to replace the instance number allocated randomly to the first instance object with the first designated instance number.

Figure 7:
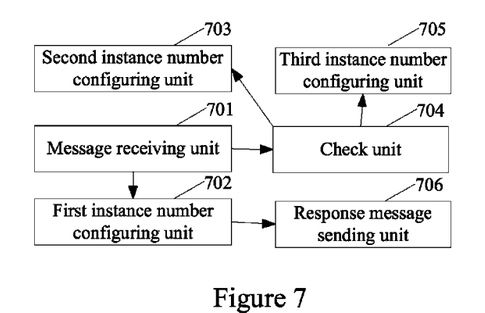
FIG. 7 is a structural diagram of a CPE according to an embodiment of the present invention.

FIG. 7 is a structural diagram of the CPE according to an embodiment of the present invention. As shown in FIG. 7, the CPE may include: a message receiving unit 701 and a first instance number configuring unit 702.

The message receiving unit 701 is configured to receive a message carrying a first designated instance number for a first instance object sent by the ACS 500.

The first instance number configuring unit 702 is configured to take the first designated instance number as the instance number for the first instance object.

Further, in an embodiment of the present invention, the CPE 510 may further include a check unit 704 and a second instance number configuring unit 703.

The check unit 704 is configured to check if the first designated instance number has been used.

The second instance number configuring unit 703 is configured to take the second designated instance number carried in the message received by the message receiving unit 701 as the instance number for the second instance object using the first designated instance number, if the checking result of the check unit 704 indicates that the first designated instance number has already been used.

In a further embodiment of the present invention, the CPE 510 may further include a check unit 704 and a third instance number configuring unit 705.

The check unit 704 is configured to check if a first designated instance number has been used or not.

The third instance number configuring unit 705 is configured to allocate an unused instance number to the second instance object using the first designated instance number, if the checking result of the check unit 704 indicates that the first designated instance number has already been used.

The CPE 510 may further include a response message sending unit 706 configured to return a response message to the ACS 500 depending on the execution result of the first instance number configuring unit 702.

Additionally, the execution result of the second instance number configuring unit 703 or the third instance number configuring unit 705 may be further contained in the returned response message.

It can be seen from the above description that, in the method, system and device of the embodiments of the present invention, the ACS designates a first designated instance number for a first instance object, and sends to the CPE a message carrying the first designated instance number for the first instance object to notify the CPE to take the first designated instance number as the instance number for the first instance object. By this way, in the event that the ACS creates the same instance object for a plurality of CPEs, the same instance number can be designated to the same instance object for the respective CPEs. Therefore, the same instance number may be used to invoke the same instance object without querying and judging each of the CPEs, thus lightening the workload of the management of CPE by ACS.

The foregoing are only the preferable embodiments of the present invention, which are not used to limit the present invention. Various modifications, equivalent substitutes and improvements shall be encompassed in the scope of the present invention without departing from the spirit and principle of the present invention.

What is claimed is:

1. A method for managing a Customer Premises Equipment (CPE), the method comprising:
   receiving, by an Auto-Configuration Server (ACS), an instance creation response message sent by the CPE, the instance creation response message containing an instance number allocated randomly to a first instance object on the CPE;
   after receiving the instance creation response message, designating, by the ACS, a first designated instance number for the first instance object on the CPE; and
   sending a message to the CPE, the message carrying the first designated instance number for the first instance object, wherein the message is adapted to notify the CPE to take the first designated instance number as an instance number for the first instance object,
   wherein the message carrying the first designated instance number for the first instance object comprises an instance number modification message in TR-069 protocol, where the instance number allocated randomly to the first instance object by the CPE is contained for notifying the CPE to replace the instance number allocated randomly to the first instance object with the first designated instance number.

2. The method according to claim 1, wherein, before the CPE takes the first designated instance number as the instance number for the first instance object, the method further comprises:
   checking, by the CPE, whether the first designated instance number has been used; and
   proceeding to take the first designated instance number as the instance number for the first instance object if the first designated instance number has not been used.

3. The method according to claim 2, wherein, if the first designated instance number has not been used, after taking the first designated instance number as the instance number for the first instance object, the method further comprises:
   returning, by the CPE, to the ACS a response message containing information indicating that the first designated instance number is not used.

4. The method according to claim 1, wherein, before the CPE takes the first designated instance number as the instance number for the first instance object, the method further comprises:
   checking, by the CPE, whether the first designated instance number has been used;
   allocating an unused instance number to a second instance object using the first designated instance number; and
   proceeding to take the first designated instance number as the instance number for the first instance object if the first designated instance number has been used.

5. The method according to claim 1, wherein, after taking the first designated instance number as the instance number for the first instance object, the method further comprises:
   sending a response message from the CPE to the ACS, the response message indicating that the first designated instance number is taken as the instance number for the first instance object.

6. A system for managing a Customer Premises Equipment (CPE), the system comprising:
- an Auto-Configuration Server (ACS) adapted to designate a first designated instance number for a first instance object on the CPE, and to send a message to the CPE, the message carrying the first designated instance number for the first instance object; and
- the CPE adapted to receive the message sent from the ACS and to take the first designated instance number as an instance number for the first instance object,
- wherein the CPE is further adapted to check whether the first designated instance number has already been used, to allocate an unused instance number to a second instance object using the first designated instance number if the first designated instance number has been used, and to return to the ACS a response message containing information of the instance number allocated to the second instance object.

7. The system according to claim 6, wherein the ACS is further adapted to carry a second designated instance number designated by the ACS itself for the second instance object using the first designated instance number in the message, wherein the message is adapted to notify the CPE to replace an instance number of the second instance object with the second designated instance number.

8. A Customer Premises Equipment (CPE) comprising:
- a message receiving unit adapted to receive a message carrying a first designated instance number for a first instance object on the CPE sent by an Auto-Configuration Server (ACS);
- a first instance number configuring unit adapted to take the first designated instance number as an instance number for the first instance object;
- a check unit adapted to check whether the first designated instance number has been used; and
- a second instance number configuring unit adapted to take a second designated instance number carried in the message received by the message receiving unit as an instance number for a second instance object using the first designated instance number, if a checking result of the check unit indicates that the first designated instance number has already been used.

9. The CPE according to claim 8, further comprising:
- a third instance number configuring unit adapted to allocate an unused instance number to the second instance object using the first designated instance number, if a checking result of the check unit indicates that the first designated instance number has already been used.

* * * * *